United States Patent [19]

Keyes, IV et al.

[11] Patent Number: 4,577,097

[45] Date of Patent: Mar. 18, 1986

[54] THREE-MODE ANALOG CONTROLLER WITH REMOTE TUNING

[75] Inventors: Marion A. Keyes, IV, Chagrin Falls; Peter K. Lui, Mentor; Jack W. Malcolm, deceased, late of Louisville, all of Ohio, by Elizabeth J. Malcolm, executrix

[73] Assignee: The Babcock & Wilcox Company, New Orleans, La.

[21] Appl. No.: 414,698

[22] Filed: Sep. 3, 1982

[51] Int. Cl.$^4$ .................................................. H01J 40/14
[52] U.S. Cl. .................................. 250/211 K; 330/59; 330/282; 250/214 R
[58] Field of Search ................ 330/59, 282, 283; 307/311; 250/211 K, 551, 206, 214 R

[56] References Cited

U.S. PATENT DOCUMENTS

| | | | |
|---|---|---|---|
| 4,172,221 | 10/1979 | Iizuka | 307/311 |
| 4,179,669 | 12/1979 | Dodson et al. | 330/59 |
| 4,396,890 | 8/1983 | Kato et al. | 330/282 |
| 4,441,080 | 4/1984 | Saari | 330/282 |

FOREIGN PATENT DOCUMENTS 255501  5/1961  Australia .......................... 330/59

Primary Examiner—David C. Nelms
Assistant Examiner—J. Gatto
Attorney, Agent, or Firm—Edward W. Rilee; Robert J. Edwards

[57] ABSTRACT

A three-mode analog controller for regulating a signal corresponding to a controller variable to produce a controller output, comprises an integrating circuit, a proportional circuit, and a derivative circuit. The integrating circuit includes a reset adjustment for varying a time constant thereof, the proportional circuit includes a gain adjustment for varying the gain thereof and the derivative circuit includes a rate adjustment for adjusting the rate of derivation of the signal. The gain adjustment comprises a photoresistor associated with a source of light which is provided with varying current corresponding to the signal to vary the resistance of the photoresistor and, thus, the gain value. The reset and rate adjustments may also comprise photoresistors with light sources or may be formed of field affect transistors each controlled by a circuit and remotely located potentiometer or variable voltage source.

9 Claims, 6 Drawing Figures

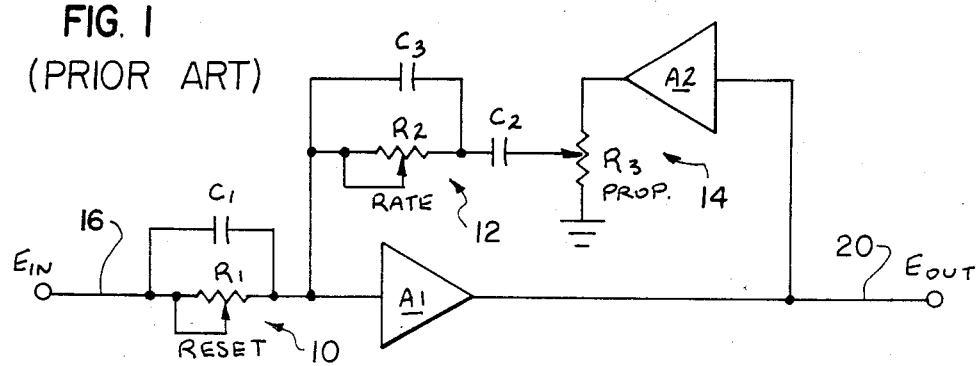
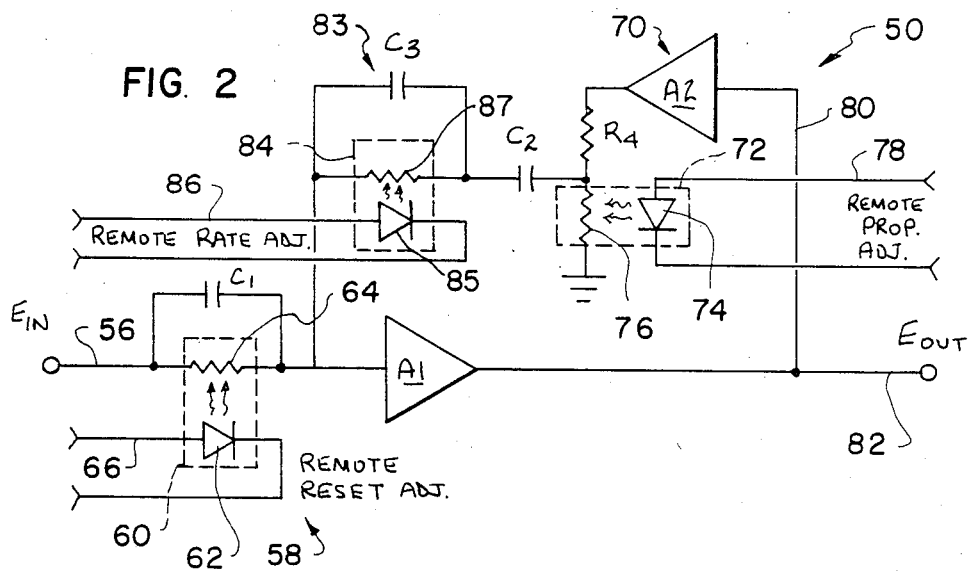

THREE-MODE ANALOG CONTROLLER WITH REMOTE TUNING

FIELD AND BACKGROUND OF THE INVENTION

The present invention relates, in general, to process controllers and, in particular, to a new and useful three-mode controller which processes a signal corresponding to a control variable according to a proportional plus integral plus derivative function which is adjustable using a photoresistor and variable light source.

Various processes, such as the generation of steam, require the use of controllers which adjust one or more parameters in a process such as temperature and pressure.

Three mode analog controllers are known which are designated proportional-plus-integral-plus-derivative controllers or PID controllers that obtain an integral value for a signal corresponding to a control variable, a derivative value therefor, and also a proportional value thereof. This provides a smoother regulation of the control parameter. Details of such PID controllers can be found in *Steam/Its Generation and Use*, 38th Ed., Babcock & Wilcox Company, 1975, Chapter 35.

As shown in FIG. 1, known three-mode controllers include three potentiometers designated 10, 12, and 14.

Potentiometer 10 is included in an integration circuit comprising capacitor C1 and resistor R1 with a movable tap for adjusting the time constant of integration. This circuit is known as a reset adjustment circuit. A control variable designated $E_{in}$ is applied at terminal 16. A rate adjustment for adjusting the rate of differentiation of the signal is provided by potentiometer 12 which is included in a derivative or rate circuit formed of capacitor $C_3$ and $C_2$ as well as variable resistor $R_2$. For additional details, see Bailey Product Instruction 4570K11-300, published by the Bailey Controls Company of Wickliffe, Ohio.

A proportional circuit for applying a selected gain to the signal is adjusted by potentiometer 14 which includes variable resistor $R_3$. Operational amplifiers A1 and A2 are also included in the circuitry to produce an output voltage $E_{out}$ at terminal 20.

The tuning adjustments of the three-mode analog controller shown in FIG. 1 have traditionally been set manually by an operator or other responsible plant personnel. Since these settings have to be manually adjusted at the controller, there is little flexibility in judiciously adapting the controller to the dynamics of the process as they occur.

There are many applications in industry which would benefit from the ability to effect a tuning modification as a direct result of actual process disturbances such as load, demand, or feed rate. Most of these opportunities are left unexplored, however, due to the lack of suitable facilities or due to the high cost and cumbersome techniques required.

FIG. 5 illustrates a super heat temperature control analog logic for a Babcock & Wilcox RB Boiler. The controller is designed to hold final superheat temperature to a preprogrammed set point value applied over a line 18 to a difference unit 22 which also receives the actual temperature from temperature transmitter 24. The difference or error signal is applied over a line 26 connected to the output of difference unit 22.

A secondary flow control loop is added to provide much faster and more suitable response. This second control loop responds to a pressure difference from pressure transmitter 28 which is processed in a controller 30 with the temperature loop information from a summing unit 32. Valve control 34 is operated according to the output of controller 30 which regulates valve 36.

A load demand signal is supplied over a line 38 to a pair of function generators 40. The demand signal is introduced to improve the overall load response. The primary temperature loop having an input at line 26 exhibits process lags (time delays) which are inversely proportional to the load demand. Consequently, higher gain and lower reset settings are more appropriate for lower load demands. The reset or integration function is provided by multiplication unit 42, function generator 40, and integrating unit 46. The gain settings are achieved by using function generators 40 and multipliers 44, and proportional unit 48.

A control system with adaptive process controllers is also disclosed in U.S. Pat. No. 3,939,328 to Davis.

SUMMARY OF THE INVENTION

According to the present invention, the potentiometers used in the prior art three-mode analog controller are replaced by one or more photoresistors. The resistance of these photoresistors is changed by controlling the current applied to the input of light emitting diodes or other light sources associated with the photoresistors. The adjustment is, thus, simplified by a voltage level which can be remotely supplied or an analog output from a computer.

According to one feature of the invention, all of the potentiometers are replaced by separate photoresistors/light source combinations.

According to another feature of the invention, the proportional adjustment utilizes the light source plus photoresistor with the rate and reset adjustment each being provided by a separate field effect transistor (FET). Each FET is connected to its own tuning circuit. The tuning setting selects a voltage which regulates the rate of change of a sawtooth waveform. When this waveform reaches a preset reference voltage, a transistor switch in the tuning circuit is turned on to reset the waveform. Each tuning circuit includes a comparator for receiving the reference voltage and the voltage from the transistor switch, with the output of the comparator becoming a square wave with a duty cycle determined by the tuning setting. This waveform is used to drive the FET between its on and off states. The tuning setting, thus, determines the effective resistance of the rate or reset circuits in the three-mode analog controller.

While the use of a light source plus photoresistor combination is known as illustrated for example in U.S. Pat. No. 2,273,537 to Rehder and G.E. Bulletin ETD-2971A, the use of these elements in a three-mode controller provides a particularly simple mechanism for remote adjustment.

By also using field effect transistors, longer rate and reset times can be achieved than using conventional approaches as illustrated in FIG. 1 above.

Accordingly, an object of the invention is to provide a three-mode analog controller for regulating a signal corresponding to a control variable to produce a control output, comprising, an integrating circuit for integrating the signal with a selected time constant and having a reset adjustment for varying the time constant, a proportional circuit for applying a selected gain to the signal and having a gain adjustment for varying the gain, and a derivative circuit for obtaining the derivative of the signal and having a rate adjustment for varying the rate of the derivative wherein at least one of the adjustments is provided by a photoresistor plus light source combination which can be supplied with a varying degree of current.

A still further object of the invention is to provide such a controller wherein the gain adjustment is formed by a light source plus photoresistor combination with the rate and reset adjustments being formed by field effect transistors controlled by separate tuning circuits each capable of comparing a reference voltage to a setting voltage and for controlling the state of the field effect transistor.

The various features of novelty which characterize the invention are pointed out with particularity in the claims annexed to and forming a part of this disclosure. For a better understanding of the invention, its operating advantages, and specific objects attained by its uses, reference is made to the accompanying drawings and descriptive matter in which preferred embodiments of the invention are illustrated.

BRIEF DESCRIPTION OF THE DRAWINGS

In the Drawings:

FIG. 1 is a schematic representation of a three-mode controller according to the prior art;

FIG. 2 is a schematic representation of a three-mode controller according to one embodiment of the invention;

DETAILED DESCRIPTION OF THE PREFERRED EMBODIMENTS

Figure 3:
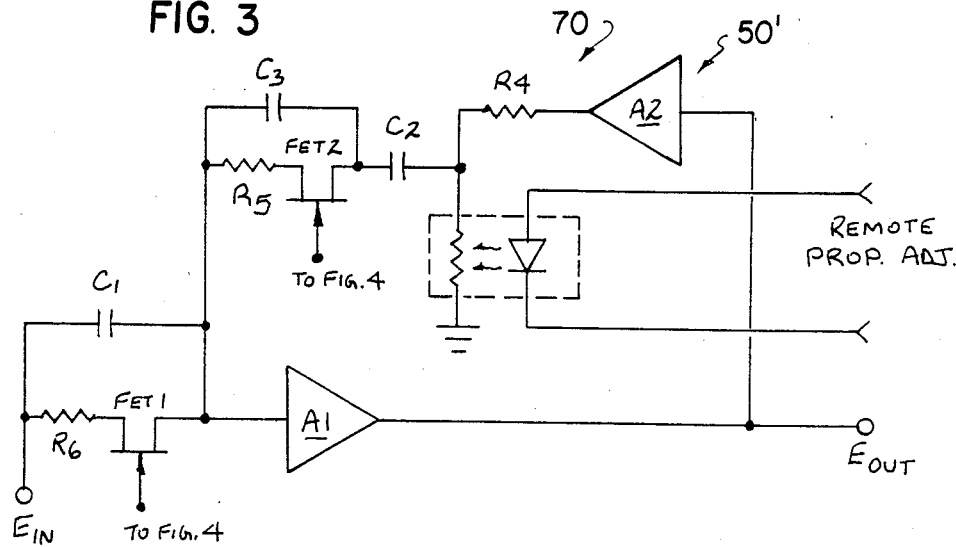
FIG. 3 is a view similar to FIG. 2 of another embodiment of the invention.

Referring to the drawings in particular, the invention embodied therein in FIG. 2 comprises a three-mode controller generally designated 50 and includes an input line 56 which carries a voltage $E_{in}$. Voltage $E_{in}$ is a signal corresponding to a controller variable which, for example, may be an error signal between desired quantity and an actual quantity for a particular process parameter such as temperature or load demand. The signal is processed in an integrating circuit generally designated 58 which includes a reset adjustment 60 comprising an LED 62 and a photoresistor 64. As in the prior art, integrating circuit 56 also includes capacitor C1.

A remote reset adjustment current is provided over line 66 to LED 62 which, in turn, regulates the resistance of photoresistor 64 to a desired extent.

Controller 50 also includes a proportional circuit generally designated 70 which comprises an operational amplifier A2, resistor R4, and a gain adjustment 72. Gain adjustment 72 also comprises a light source, specifically a LED 74 and photoresistor 76. By applying a current of selected magnitude over line 78, LED 74 is lit to a varied extent which adjusts the gain applied by proportional circuit 70 to a feedback signal received over line 80 from the output 82 of the controller 50.

A derivative circuit 83 is also provided which comprises capacitors C2 and C3 and a rate adjustment 84. Rate adjustment 84 also comprises LED 85 plus photoresistor 87 and is controlled by current over line 86. Operational amplifier A1 completes the controller circuit which functions in the same manner as the prior art circuit shown in FIG. 1 but which can be operated remotely and automatically in an adaptive manner. The functioning of the circuit shown in FIG. 1 is set forth in the circuit detail in Bailey Product Instruction 4570K11-300 published by the Bailey Controls Company of Wickliffe, Ohio.

FIG. 3 discloses a different embodiment of the controller designated 50', which while utilizing a photoresistor arrangement for the proportional circuit 70, uses field effect transistors FET 1 and FET 2 for the reset and rate adjustment functions respectively.

Other functions of the circuit remain the same as those of FIGS. 1 and 2.

Figure 4:
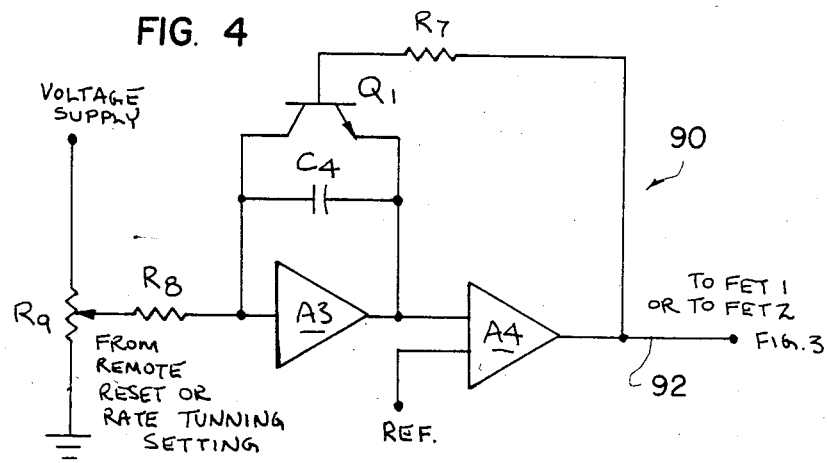
FIG. 4 is a schematic representation of a tuning circuit which can be used both for a reset and for a rate adjustment in the embodiment of FIG. 3.

FIG. 4 illustrates an exemplary tuning circuit generally designated 90 which can be used to control FET 1 or FET 2 with a duplicate circuit provided for the other field affect transistor.

Circuit 90 includes switching transistor Q1 which has capacitor C4 connected across its emitter to collector junction. Resistor R7 connects the base of Q1 to the output line 92 which may be connected to one of the field effect transistors of FIG. 3.

A set point voltage can be provided by a potentiometer formed by resistor R9 or generated in the process to be controlled. This voltage is amplified in operational amplifier A3 which with transistor switch Q1 produces a sawtooth wave form having a variable duty cycle which varies with the voltage supplied to circuit 90. This sawtooth is compared with a reference in amplifier A4 to generate a square wave with the same duty cycle on output line 92. By connecting line 92 to one of the field effect transistors of circuit 50', that field effect transistor is driven between its on and off states at a rate which determines effective resistance of the rate or reset adjustments.

Figure 6:
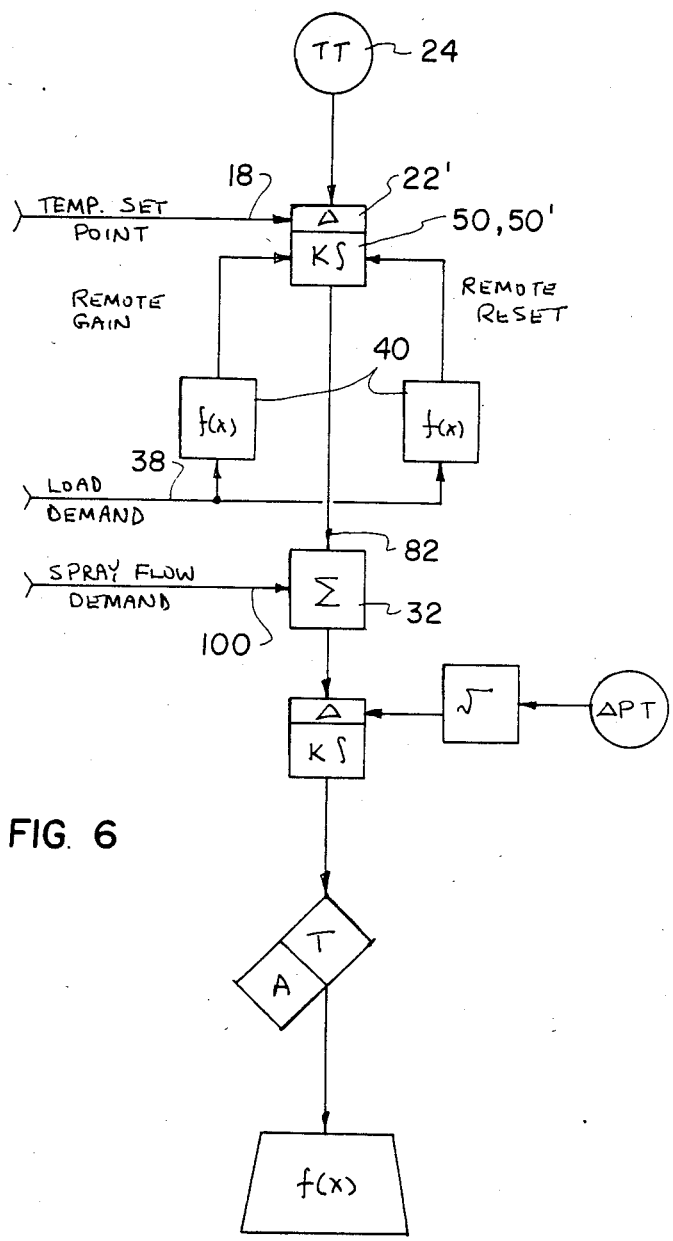
FIG. 6 is a view similar to FIG. 5 of an improved super heat spray valve control according to the invention.

FIG. 6 illustrates a possible environment for the inventive controller shown at 50, 51'. A signal is provided by a difference unit 22' which corresponds to the difference between an actual temperature from temperature transmitter 24 and a temperature set point from line 18.

Throughout the drawings similar numbers are used to designate functionally similar parts.

Function generators 40 are supplied with a demand signal over line 38 and output into circuit 50, 50' to provide remote gain tuning adjustment and remote reset tuning adjustment setting values. The regulated control value is generated at controller output line 82, to a summing unit 32 which combines this value with a spray flow demand signal applied over line 100. The remainder of the circuit is the same as in the prior art shown in FIG. 5.

According to the invention, benefit is achieved in that the gain and reset function blocks can now be combined into a two mode controller. The conditions for changing the tuning parameters are coupled directly into the controller. With this configuration, further enhancement is possible. Derivative action (rate) can be incorporated readily into a three-mode controller and can be tuned in a similar fashion. Also, a feed forward controller can be utilized to eliminate the summing unit 32 used for the spray signal. The function generators are retained so as to maintain complete flexibility as far as the characterization of the demand signals with reference to the absolute tuning values. The secondary control, relatively fast flow loop, can remain unchanged.

Figure 5:
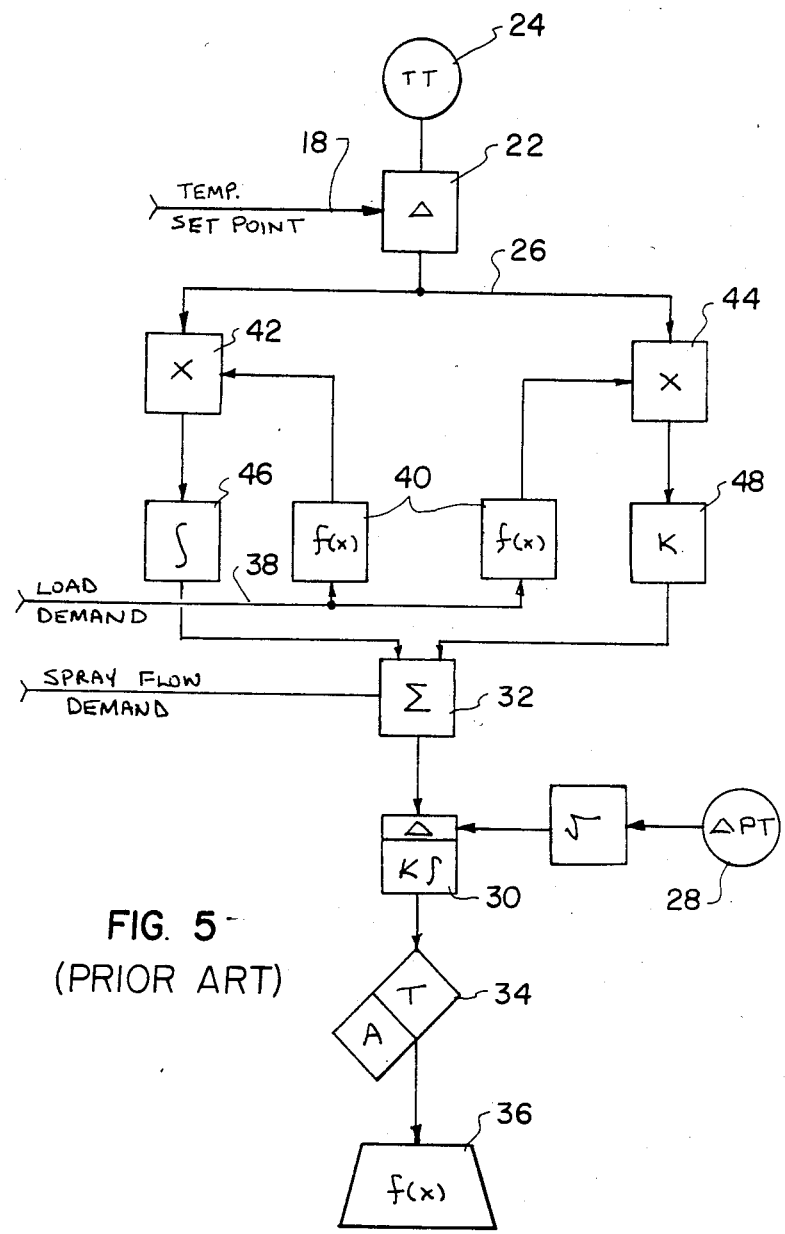
FIG. 5 is a block diagram illustrating the operation of a super heat spray valve control according to the prior art.

The invention, as illustrated in FIG. 6, significantly reduces the number of pieces of hardware required to implement a more flexible scheme than used in FIG. 5. This reduction in equipment directly increases system reliability and availability.

What is claimed is:

1. A three-mode analog controller for regulating a signal corresponding to a control variable to produce a control output comprising:
   an integrating circuit for integrating the signal with a selected time constant and having a reset adjustment for varying the time constant;
   a proportional circuit for applying a selected gain to the signal and having a gain adjustment for varying the gain; and
   a derivative circuit for obtaining a derivative of the signal at a selected rate and having a rate adjustment for varying the rate;
   wherein said reset, gain, and rate adjustments comprise a light source, a current line connected between said signal and source for applying a current value to said light source for producing a varied light emission from said light source corresponding to said signal and a photoresistor which varies in resistance with variations in light emitted by said light source.

2. A controller according to claim 1, wherein each of said reset, gain, and rate adjustments comprise a separate light source and separate photoresistor.

3. A controller according to claim 2, including an input terminal for receiving the signal and an output terminal for supplying the control output, a first one of said photoresistors connected to said input terminal, a first capacitor connected in parallel to said first photoresistor, a first operational amplifier connected between said first photoresistor and said output terminal; said derivative circuit comprising a second one of said photoresistors connected to said first operational amplifier input, a second capacitor connected in series with said second photoresistor and a third capacitor connected in parallel with said second photoresistor; said proportional circuit comprising a second operational amplifier having an input connected to said output terminal and an output connected to said second capacitor, a third one of said photoresistors connected between said second capacitor and a ground.

4. A three-mode analog controller for regulating a signal corresponding to a control variable to produce a control output comprising:
   an integrating circuit for integrating the signal with a selected time constant and having a reset adjustment for varying the time constant;
   a proportional circuit for applying a selected gain to the signal and having a gain adjustment for varying the gain;
   a derivative circuit for obtaining a derivative of the signal at a selected rate and having a rate adjustment for varying the rate;
   wherein each of said integrating and derivative circuits include a field affect transistor and a tuning circuit connected to each field affect transistor for operating each field affect transistor at a selected duty cycle to vary the resistance of each field effect transistor respectively.

5. A controller according to claim 4, wherein each tuning circuit comprises an input terminal for receiving a variable selected voltage value, a first operational amplifier having an input connected to said circuit input and an output, a tuning circuit capacitor connected in parallel with said first operational amplifier, a switching transistor having an emitter collector junction connected across said tuning circuit capacitor, said tuning circuit having an output connected to base of said switching transistor, a second operational amplifier having a first input connected to said first operational amplifier output and a second input adapted to receive a reference voltage, said second operational amplifier acting as a comparator and having an output connected to said tuning circuit output, said tuning circuit output connected to a base of one of said field effect transistors.

6. A controller according to claim 5, including an input terminal for receiving the signal and an output terminal for supplying the controller output, said integrating circuit comprising a first resistor connected to said input terminal and to a first one of said field effect transistors, a first capacitor connected in parallel across said first resistor and first field effect transistor; a third operational amplifier having an input connected to said first field effect transistor and an output connected to said output terminal; said derivative circuit comprising a second resistor connected to said third operational amplifier input and to a second one of said field effect transistors, a second capacitor connected in parallel to said second resistor and second field effect transistor, a third capacitor connected in series with said second capacitor and parallel connected second resistor and second field effect transistor; said proportional circuit comprising a fourth operational amplifier connected between said output terminal and said second capacitor, a potentiometer connected between said second capacitor and a ground.

7. A three-mode analog controller for regulating a signal corresponding to a control variable to produce a control output comprising:
   an integrating circuit for integrating the signal with a selected time constant and having a reset adjustment for varying the time constant;
   a proportional circuit for applying a selected gain to the signal and having a gain adjustment for varying the gain;
   a derivative circuit for obtaining a derivative of the signal at a selected rate and having a rate adjustment for varying the rate;
   wherein said proportional circuit includes a light source, a current line connected between said signal and source for applying a constant value to said light source for producing a varied light emission from said light source corresponding to said signal and a photoresistor which varies in resistance with variations in light emitted by said light source, each of said integrating and derivative circuits including a field affect transistor and a tuning circuit connected to each field affect transistor for operating each field affect transistor at a selected duty cycle to vary the resistance of each field effect transistor respectively.

8. A controller according to claim 7, wherein each tuning circuit comprises an input terminal for receiving a variable selected voltage value, a first operational amplifier having an input connected to said circuit input and an output, a tuning circuit capacitor connected in parallel with said first operational amplifier, a switching transistor having an emitter collector junction connected across said tuning circuit capacitor, said tuning circuit having an output connected to base of said switching transistor, a second operational amplifier having a first input connected to said first operational amplifier output and a second input adapted to receive a reference voltage, said second operational amplifier acting as a comparator and having an output connected to said tuning circuit output, said tuning circuit output connected to a base of one of said field effect transistors.

9. A controller according to claim 8, including an input terminal for receiving the signal and an output terminal for supplying the controller output, said integrating circuit comprising a first resistor connected to said input terminal and to a first one of said field effect transistors, a first capacitor connected in parallel across said first resistor and first field effect transistor; a third operational amplifier having an input connected to said first field effect transistor and an output connected to said output terminal; said derivative circuit comprising a second resistor connected to said third operational amplifier input and to a second one of said field effect transistors, a second capacitor connected in parallel to said second resistor and second field effect transistor, a third capacitor connected in series with said second capacitor and parallel connected second resistor and second field effect transistor; said proportional circuit comprising a fourth operational amplifier connected between said output terminal and said second capacitor, said photoresistor connected between said second capacitor and a ground.

* * * * *